(12) United States Patent
Matsumoto (10) Patent No.: US 11,335,942 B2
(45) Date of Patent: May 17, 2022

(54) METHOD FOR PRODUCING LAMINATED ELECTRODE ASSEMBLY

(71) Applicant: TOYOTA JIDOSHA KABUSHIKI KAISHA, Toyota (JP)

(72) Inventor: Mizuho Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/791,596

(22) Filed: Oct. 24, 2017

(65) Prior Publication Data

US 2018/0115013 A1 Apr. 26, 2018

(30) Foreign Application Priority Data

Oct. 25, 2016 (JP) .............................. JP2016-208597

(51) Int. Cl.
*H01M 10/04* (2006.01)
*B32B 37/06* (2006.01)
(Continued)

(52) U.S. Cl.
CPC ......... *H01M 10/0468* (2013.01); *B32B 37/06* (2013.01); *H01M 10/0463* (2013.01);
(Continued)

(58) Field of Classification Search
CPC .......... H01M 2/0275; H01M 10/0486; H01M 10/0463; H01M 10/0468; H01M 10/0525;
(Continued)

(56) References Cited

U.S. PATENT DOCUMENTS 3,640,049 A * 2/1972 Fritz ..................... B65B 53/063
206/394
5,912,090 A * 6/1999 Nagai ................. H01M 2/0275
429/131
(Continued)

FOREIGN PATENT DOCUMENTS

CN 102438833 A 5/2012
CN 104335410 A 2/2015
(Continued)

*Primary Examiner* — Jacob T Minskey
*Assistant Examiner* — Caroline Beha
(74) *Attorney, Agent, or Firm* — Sughrue Mion, PLLC (57) ABSTRACT

Provided is a method capable of producing, with excellent operability, a laminated electrode assembly which is stably restrained. The method for producing a laminated electrode assembly disclosed herein includes a step of preparing a laminate in which a plurality of positive electrode sheets and a plurality of negative electrode sheets are alternately laminated, and a separator is interposed between each positive electrode sheet and each negative electrode sheet; a step of enveloping, with a heat shrinkable film, four faces of the laminate including a pair of main faces perpendicular to a lamination direction of the laminate and facing each other, and a pair of end faces parallel to the lamination direction of the laminate and facing each other; and a step of heating the pair of end faces while sandwiching the pair of main faces with a cooling plate to thermally shrink the heat shrinkable film on the pair of end faces.

4 Claims, 7 Drawing Sheets

(51) Int. Cl.
*H01M 50/116* (2021.01)
*H01M 10/0585* (2010.01)
*H01M 10/0525* (2010.01)
*H01M 50/131* (2021.01)
*H01M 50/166* (2021.01)
*H01M 50/171* (2021.01)

(52) U.S. Cl.
CPC ....... H01M 50/116 (2021.01); *B32B 2457/10* (2013.01); *H01M 10/0525* (2013.01); *H01M 10/0585* (2013.01); *H01M 50/131* (2021.01); *H01M 50/166* (2021.01); *H01M 50/171* (2021.01); *H01M 2220/20* (2013.01); *Y02E 60/10* (2013.01)

(58) Field of Classification Search
CPC ........... H01M 2/0413; H01M 10/0585; H01M 2002/0297; H01M 2220/20; H01M 50/116; H01M 50/131; H01M 50/166; H01M 50/171; H01M 10/0436; H01M 10/0413; H01M 10/052; B29C 65/55; B29C 65/68; B29C 66/73715; B32B 37/06; B32B 2457/10; Y02E 60/122; Y02E 60/10; Y02P 70/50
USPC .............................................. 156/84, 85, 86
See application file for complete search history.

(56) References Cited

U.S. PATENT DOCUMENTS

| | | | |
|---|---|---|---|
| 6,040,085 A * | 3/2000 | Cheu | H01M 2/0275 429/162 |
| 6,492,058 B1 * | 12/2002 | Watanabe | H01M 2/1061 429/121 |
| 7,811,703 B2 * | 10/2010 | Fujita | H01M 4/131 429/209 |
| 8,617,258 B2 * | 12/2013 | Kwon | H01M 2/022 29/623.1 |
| 9,048,463 B2 * | 6/2015 | Lappe | H01M 2/021 |
| 2009/0280398 A1 * | 11/2009 | Park | H01M 2/0212 429/100 |
| 2012/0094082 A1 * | 4/2012 | Michalk | B32B 3/30 428/172 |
| 2014/0106204 A1 | 4/2014 | Tononishi | |
| 2015/0111095 A1 | 4/2015 | Sato et al. | |
| 2016/0164133 A1 | 6/2016 | Matsumoto et al. | |
| 2016/0226042 A1 * | 8/2016 | Hartmann | H01M 2/1094 |
| 2016/0226114 A1 * | 8/2016 | Hartmann | C08G 18/10 |
| 2018/0175451 A1 * | 6/2018 | Inoue | H01M 10/0587 |

FOREIGN PATENT DOCUMENTS

| | | |
|---|---|---|
| JP | 62-229667 A | 10/1987 |
| JP | 62-278771 A | 12/1987 |
| JP | 7-183160 A | 7/1995 |
| JP | 2002-208442 A | 7/2002 |
| JP | 2003-223933 A | 8/2003 |
| JP | 2003-272595 A | 9/2003 |
| JP | 2003272595 A * | 9/2003 |
| JP | 2014-093128 A | 5/2014 |
| JP | 2016-110892 A | 6/2016 |
| KR | 1020130095371 A | 8/2013 |
| KR | 1020140047535 A | 4/2014 |
| TW | 437116 B | 5/2001 |

* cited by examiner

METHOD FOR PRODUCING LAMINATED ELECTRODE ASSEMBLY

BACKGROUND OF THE INVENTION

1. Field of the Invention

The present teaching relates to a method for producing a laminated electrode assembly. The present application claims priority based on Japanese Patent Application No. 2016-208597 filed on Oct. 25, 2016, the entire contents of which are incorporated herein by reference.

2. Description of the Related Art

Since nonaqueous electrolyte secondary batteries such as lithium ion secondary batteries (lithium secondary batteries) are lighter in weight and higher in energy density than existing batteries, nonaqueous electrolyte secondary batteries have recently been put to use as the so-called portable power supplies for personal computers, portable terminals, etc. and also as drive power supplies for vehicles. In particular, lithium ion secondary batteries that are light-weight and can produce a high energy density are expected to be more and more popular as high-output power supplies for driving vehicles such as electric vehicles (EV), hybrid vehicles (HV) and plug-in hybrid vehicles (PHV).

A nonaqueous electrolyte secondary battery typically has a configuration in which an electrode assembly including a positive electrode sheet and a negative electrode sheet is housed together with a nonaqueous electrolyte in a battery case. As the electrode assembly, a laminated electrode assembly and a wound electrode assembly are mainly used.

Among the electrode assemblies, a laminated electrode assembly has a structure in which a plurality of positive electrode sheets each having a positive electrode active material layer and a plurality of negative electrode sheets each having a negative electrode active material layer are alternately laminated and a separator is interposed between each positive electrode sheet and each negative electrode sheet. In the laminated electrode assembly, lamination displacement, that is, the displacement of the positive electrode sheet, negative electrode sheet, and separator in a plane perpendicular to the lamination direction, is likely to occur. Accordingly, for example, Japanese Patent Application Publication No. 2014-93128 suggests restraining the laminated electrode assembly by affixing a lamination displacement preventing tape to four end faces parallel to the lamination direction of the laminated electrode assembly in order to prevent the lamination deviation and maintain the laminated structure.

SUMMARY OF THE INVENTION

However, in the case of preventing the lamination displacement by using the tape, breakage (particularly, peeling of the active material layer in the bonded portion between the tape and the active material layer) may occur at the bonded portion between the tape and the outermost layer (for example, electrode, separator) of the laminated electrode assembly, and the tape may be peeled off during the operation. Further, the restraining force can be reduced due to the deflection of the tape during the operation. Therefore, from the standpoint of stably restraining the laminated electrode assembly during the operation, there is still room for improvement. Furthermore, from the standpoint of efficiency, there is room for improvement of the operation of affixing the tape at a plurality of locations while maintaining the laminated structure at the time of producing the laminated electrode assembly.

It is therefore an object of the present teaching to provide a method capable of producing, with excellent operability, a laminated electrode assembly which is stably restrained.

The method for producing a laminated electrode assembly disclosed herein includes: a step of preparing a laminate in which a plurality of positive electrode sheets and a plurality of negative electrode sheets are alternately laminated, and a separator is interposed between each positive electrode sheet and each negative electrode sheet; a step of enveloping, with a heat shrinkable film, four faces of the laminate including a pair of main faces perpendicular to a lamination direction of the laminate and facing each other, and a pair of end faces parallel to the lamination direction of the laminate and facing each other; and a step of heating the pair of end faces while sandwiching the pair of main faces with a cooling plate to thermally shrink the heat shrinkable film on the pair of end faces.

With such a configuration, the lamination displacement of the positive electrode sheet, negative electrode sheet, and separator is suppressed by restraining the laminated electrode assembly by utilizing the heat shrinkage of the heat shrinkable film. Therefore, it is possible to solve the problem of damage in the bonded portion between the tape and the outermost layer of the laminated electrode assembly during the operation and the problem of reduction of the restraining force caused by the deflection of the tape during the operation can be resolved. Further, it is not necessary to perform a complex operation of affixing the tape at a plurality of locations.

Therefore, with such a configuration, it is possible to produce, with excellent operability, a laminated electrode assembly which is stably restrained.

In a desired embodiment of the method for producing a laminated electrode assembly disclosed herein, the heat shrinkable film has a cutout portion, and the cutout portion is arranged on the end face parallel to the lamination direction of the laminate in the step of enveloping with the heat shrinkable film.

With such a configuration, it is possible to increase the area of the opening portion at the end face parallel to the lamination direction of the laminated electrode assembly by the cutout portion. This improves the impregnation property of the nonaqueous electrolyte into the laminated electrode assembly when producing a nonaqueous electrolyte secondary battery such as a lithium ion secondary battery. Further, the absorption property and release property of the nonaqueous electrolyte during charging and discharging of the nonaqueous electrolyte secondary battery are improved. Furthermore, the release property of gas from the laminated electrode assembly when abnormality occurs in the nonaqueous electrolyte secondary battery is improved.

In addition, adaptability to the design of various laminated electrode assemblies is ensured.

DESCRIPTION OF THE PREFERRED EMBODIMENT

An embodiment of the present teaching will be described hereinbelow with reference to the drawings. Further, matters other than those particularly mentioned in the present specification, and necessary for the implementation of the present teaching (for example, the general configuration and production process of a negative electrode and a secondary battery not characterizing the present teaching) can be grasped as design matters by a person skilled in the art based on the related art in the pertinent field. The present teaching can be carried out based on the contents disclosed in the present specification and common technical sense in the pertinent field. In addition, in the drawings described below, the members or sections exhibiting the same effects are given the same reference numerals. Moreover, the dimensional relationship (length, width, thickness, etc.) in the drawings does not reflect the actual dimensional relationship.

An embodiment of the present teaching will be described hereinbelow, but the present teaching is not intended to be limited to this embodiment.

Figure 1:
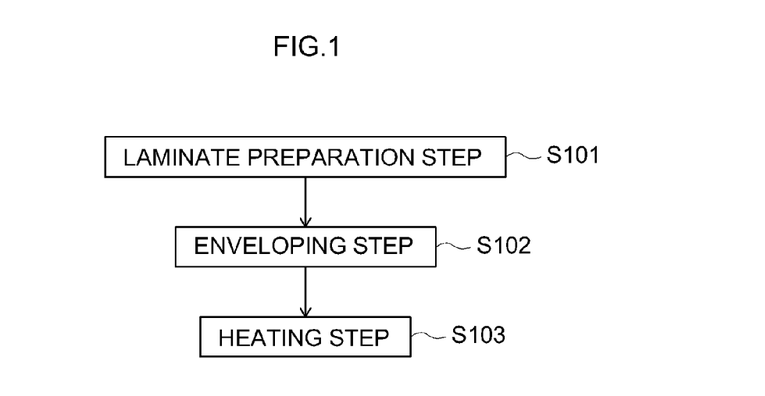
FIG. 1 is a flowchart showing each step of a method for producing a laminated electrode assembly according to an embodiment of the present teaching.

FIG. 1 shows each step of the method for producing a laminated electrode assembly according to the present embodiment. The method for producing a laminated electrode assembly according to the present embodiment includes: a step (laminate preparation step) S101 of preparing a laminate in which a plurality of positive electrode sheets and a plurality of negative electrode sheets are alternatively laminated, and a separator is interposed between each positive electrode sheet and each negative electrode sheet; a step (enveloping step) S102 of enveloping, with a heat shrinkable film, four faces of the laminate including a pair of main faces perpendicular to a lamination direction of the laminate and facing each other, and a pair of end faces parallel to the lamination direction of the laminate and facing each other; and a step (heating step) S103 of heating the pair of end faces while sandwiching the pair of main faces with a cooling plate to thermally shrink the heat shrinkable film on the pair of end faces.

Figure 2:
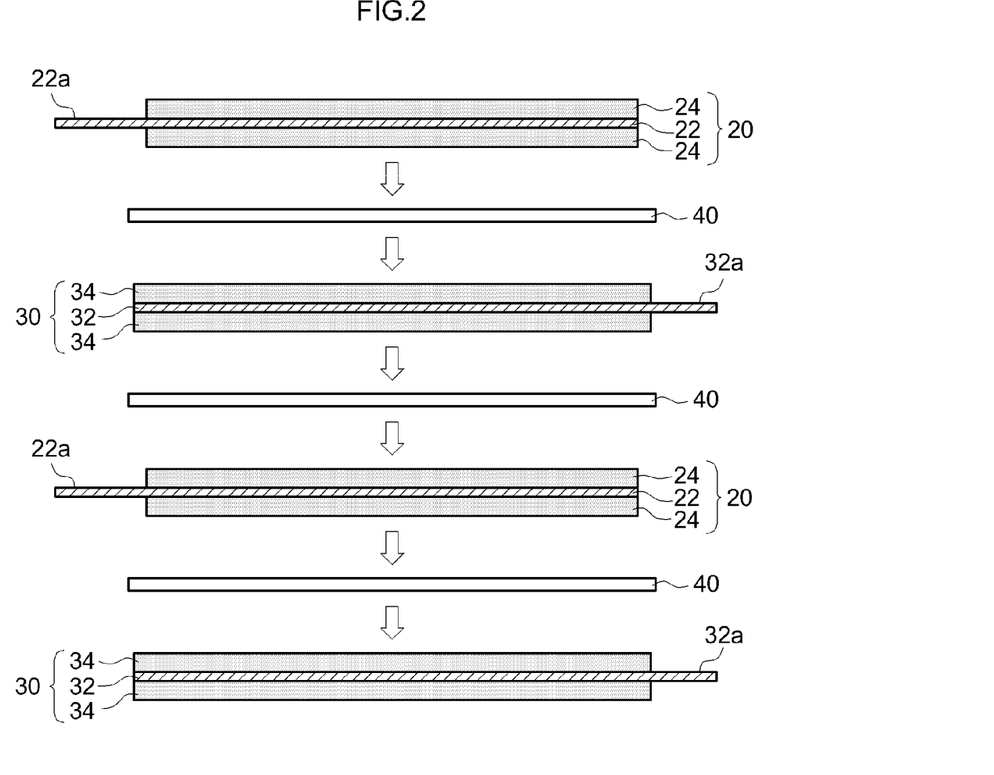
FIG. 2 is a diagram schematically showing an outline of a laminate preparation step of the method for producing a laminated electrode assembly according to the embodiment of the present teaching.

First, the laminate preparation step S101 will be described. FIG. 2 schematically shows the outline of the step S101. In the step S101, a laminate 10 is prepared. In the laminate 10, a plurality of positive electrode sheets 20 and a plurality of negative electrode sheets 30 are alternately laminated, and a separator 40 is interposed between each positive electrode sheet 20 and each negative electrode sheet 30.

The positive electrode sheet 20, the negative electrode sheet 30, and the separator 40 can be the same, without particular limitation, as those used in the conventional secondary batteries (particularly, nonaqueous electrolyte secondary batteries such as lithium ion secondary batteries).

For example, the positive electrode sheet 20 includes a positive electrode active material layer 24 on one surface or both surfaces (here, both surfaces) of a positive electrode current collector 22. Further, for example, the positive electrode sheet 20 includes a positive electrode sheet current collecting portion 22a in which the positive electrode active material layer 24 is not provided and the positive electrode current collector 22 is exposed.

For example, an aluminum foil can be used for the positive electrode current collector 22.

The positive electrode active material layer 24 includes a positive electrode active material. Examples of the positive electrode active material include lithium transition metal oxides (for example, $LiNi_{1/3}Co_{1/3}Mn_{1/3}O_2$, $LiNiO_2$, $LiCoO_2$, $LiFeO_2$, $LiMn_2O_4$ and $LiNi_{0.5}Mn_{1.5}O_4$) and lithium transition metal phosphates (for example, $LiFePO_4$). The positive electrode active material layer 24 may contain components other than the positive electrode active material, for example, a conductive material and a binder. As the conductive material, for example, carbon black such as acetylene black (AB) or other carbon materials (for example, graphite) can be advantageously used. As the binder, for example, polyvinylidene fluoride (PVDF) can be used.

The positive electrode sheet 20 can be prepared according to a known method.

For example, the negative electrode sheet 30 includes a negative electrode active material layer 34 on one surface or both surfaces (here, both surfaces) of a negative electrode current collector 32. Further, for example, the negative electrode sheet 30 includes a negative electrode sheet current collecting portion 32a in which the negative electrode active material layer 34 is not provided and the negative electrode current collector 32 is exposed.

For example, a copper foil can be used for the negative electrode current collector 32.

The negative electrode active material layer 34 includes a negative electrode active material. As the negative electrode active material, carbon materials such as graphite, hard carbon and soft carbon can be used. The negative electrode active material layer 34 may include components other than the negative electrode active material, such as a binder and a thickener. As the binder, for example, styrene butadiene rubber (SBR) can be used. As the thickener, for example, carboxymethyl cellulose (CMC) can be used.

The negative electrode sheet 30 can be prepared according to a known method.

The separator 40 can be exemplified by a porous sheet (film) made of a resin such as polyethylene (PE), polypropylene (PP), a polyester, cellulose and a polyamide. Such a porous sheet may have a monolayer structure or a laminated structure of two or more layers (for example, a three layer structure in which a PP layer is laminated on both surfaces of a PE layer).

A heat-resistant layer (HRL) may be provided on the surface of the separator 40.

The separator 40 can be prepared according to a known method.

The laminate 10 can be prepared according to a known method. For example, as shown in FIG. 2, the laminate 10 can be prepared by alternately laminating the positive electrode sheet 20 and the negative electrode sheet 30 while interposing the separator 40 therebetween.

FIG. 2 schematically illustrates the step S101; the actual number of laminated layers of the positive electrode sheet 20, the negative electrode sheet 30, and the separator 40 is not shown in the figure. The number of laminated layers of the positive electrode sheet 20, the negative electrode sheet 30, and the separator 40 may be appropriately determined according to the design of the laminate 10.

Further, the outermost layer of the laminate 10 may be any of the positive electrode sheet 20, the negative electrode sheet 30, and the separator 40.

Further, a porous sheet made of the same material as the separator 40 may be wrapped around the laminate 10 for the purpose of insulation.

Figure 3:
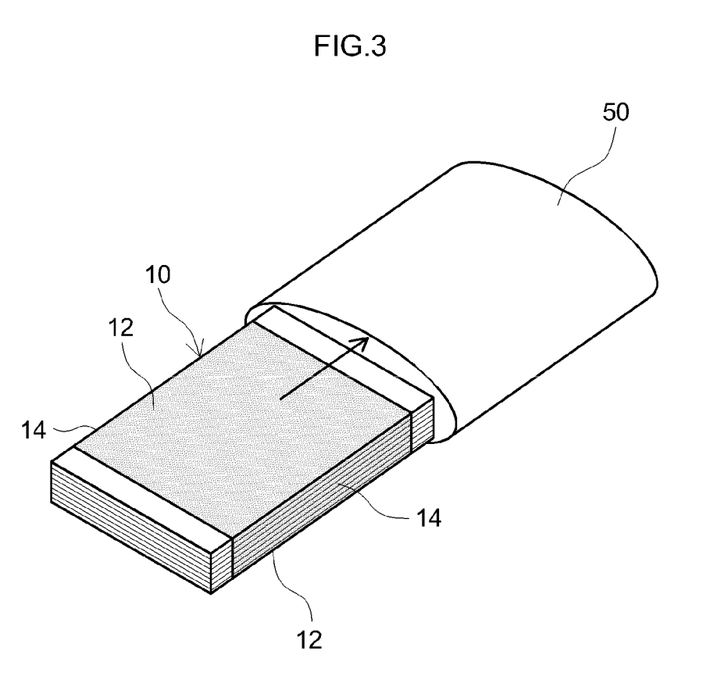
FIG. 3 is a perspective view schematically showing an outline of an enveloping step of the method for producing a laminated electrode assembly according to the embodiment of the present teaching.

Next, the enveloping step S102 will be described. FIG. 3 schematically shows the outline of the step S102. In the step S102, four faces of the laminate 10 including a pair of main faces 12 perpendicular to the lamination direction of the laminate 10 and facing each other, and a pair of end faces 14 parallel to the lamination direction of the laminate 10 and facing each other are enveloped by a heat shrinkable film 50.

In the present embodiment, as shown in FIG. 3, a tubular heat shrinkable film 50 is used.

In the case where the laminate is conventionally fixed with a tape, a step-shaped portion is formed in the tape fixing portion. However, when the tubular heat shrinkable film 50 is used as in the present embodiment, it is possible to prevent the formation of the step-shaped portion.

As the heat shrinkable film 50, for example, a polyethylene terephthalate shrinkable film, a polystyrene shrinkable film, a polyolefin shrinkable film, a polyvinyl chloride shrinkable film, and a polycarbonate shrinkable film can be used.

In the present specification, the term "heat shrinkable film" means a film having a shrinkage ratio in a main shrinking direction of the film of 10% or more when the film is immersed for 10 s in hot water at 80° C. The heat shrinkage ratio of the heat shrinkable film in the main shrinking direction when the film is immersed for 10 s in hot water at 80° C. is desirably 15% to 100%, more desirably 20% to 85%.

The heat shrinkage ratio can be determined, for example, as follows. The film is cut into a square of 10 cm×10 cm and is thermally shrunk by immersing for 10 s in hot water at 80° C. in a no-load state. The film is then immersed for 10 s in water at 25° C. and cooled. The longitudinal and transverse dimensions of the film taken out from the water are measured, and the heat shrinkage ratio is calculated by the following formula.

Heat shrinkage ratio={[(length before shrinkage)−(length after shrinkage)]/(length before shrinkage)}×100(%)

Among the longitudinal and transverse directions, the direction with a larger heat shrinkage ratio is defined as the main shrinkage direction.

As for the heat shrinkage ratio, it is desirable that the heat shrinkage ratio in the direction of enveloping the four faces of the laminate 10 with the heat shrinkable film 50 be 10% or more.

The main shrinking direction of the heat shrinkable film is desirably the direction of enveloping the four faces of the laminate 10 with the heat shrinkable film 50.

As shown in FIG. 3, the enveloping step S102 can be carried out by inserting the laminate 10 into the tubular heat shrinkable film 50.

As long as the heat shrinkable film 50 envelops the four faces, namely, the pair of main faces 12 and the pair of end faces 14, the heat shrinkable film may cover a part of each face or cover the faces entirely. Desirably, the heat shrinkable film 50 covers parts of the pair of main faces 12 and the pair of end faces 14 so that the current collecting portion of the positive electrode sheet 20 and the current collecting portion of the negative electrode sheet 30 of the laminate 10 are exposed.

Figure 4A:
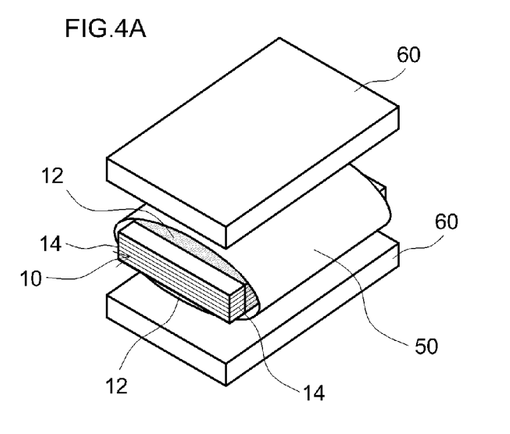
FIGS. 4A to 4C are perspective views schematically showing an outline of a heating step of the method for producing a laminated electrode assembly according to the embodiment of the present teaching.
Figure 4B:
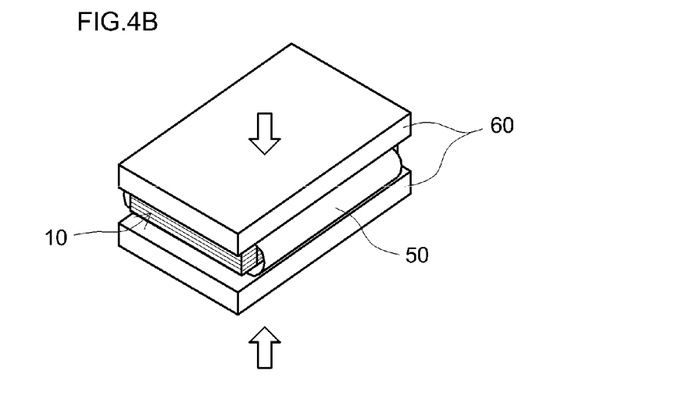
Figure 4C:
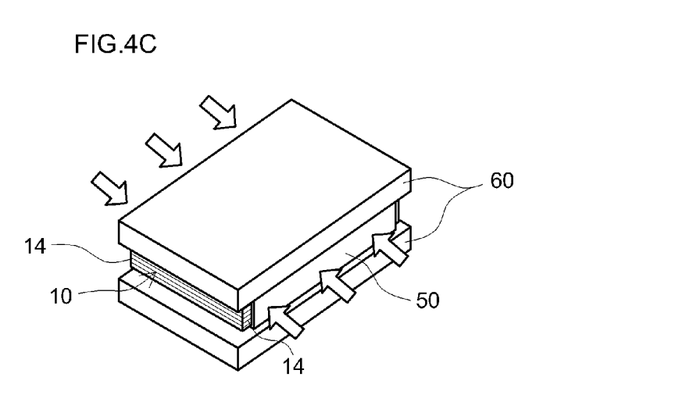

Next, the heating step S103 will be described. FIG. 4 schematically shows the outline of the step S103. In the step S103, the pair of end faces 14 is heated while sandwiching the pair of main faces 12 of the laminate 10 with the cooling plates 60, and the heat shrinkable film 50 is shrunk on the pair of end faces 14.

Specifically, first, as shown in FIGS. 4A and 4B, the pair of main faces 12 of the laminate 10 enveloped by the heat shrinkable film 50 is sandwiched by the pair of cooling plates 60. Therefore, the heat shrinkable film 50 on the main face 12 is sandwiched between the laminate 10 and the cooling plates 60.

As for the cooling conditions, it is desirable to cool down to such a degree that the heat shrinkable film 50 on the pair of main faces 12 of the laminate 10 be not shrunk by the heating performed in the step S103.

When sandwiching the laminate 10 with the cooling plates 60, it is desirable to apply a predetermined load to compress the laminate 10 to a predetermined thickness. In this case, since the laminate 10 can be restrained in a compressed state, the production efficiency of the laminated electrode assembly is improved.

After sandwiching the laminate 10 with the cooling plates 60, the pair of end faces 14 is heated as shown in FIG. 4C. The heating method is not particularly limited and examples thereof include heating with hot air, heating with a heating plate, and heating by infrared irradiation. In FIG. 4C, heating is performed by supplying warm air to the end face 14 in the direction of the arrow.

This heating causes shrinkage of the heat shrinkable film 50 on the pair of end faces 14. A restraining force is generated by the shrinking force of the heat shrinkable film 50, and the lamination displacement of the positive electrode sheet 20, the negative electrode sheet 30, and the separator 40 is suppressed.

Therefore, the heating conditions may be appropriately set according to the heat shrinkage temperature and the heat shrinkage ratio of the heat shrinkable film 50 to be used.

Here, the pair of main faces 12 of the laminate 10 is cooled by the cooling plates 60. Therefore, since the heat shrinkable film 50 can be shrunk only on the pair of end faces 14 of the laminate 10, the thickness of the laminate 10 (that is, the dimension in the lamination direction) can be kept uniform.

Further, the separator 40 constituting the laminate 10 is a member which is relatively weak against heat. Therefore, by cooling the pair of main faces 12 of the laminate 10 with the cooling plates 60, heat-induced degradation of the separator 40 can be prevented.

Figure 5:
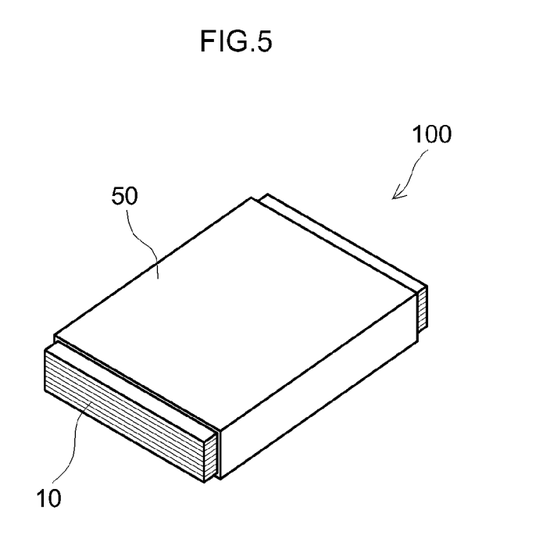
FIG. 5 is a perspective view schematically showing a laminated electrode assembly completed by the method for producing a laminated electrode assembly according to the embodiment of the present teaching.

In this way, the laminated electrode assembly 100 shown in FIG. 5 can be obtained.

According to the present embodiment, the lamination displacement of the positive electrode sheet 20, the negative electrode sheet 30, and the separator 40 is suppressed by restraining the laminated electrode assembly 100 by utilizing the heat shrinkage of the heat shrinkable film 50. Therefore, it is possible to solve the problem of damage in the bonded portion between the tape and the outermost layer (for example, electrode, separator) of the laminated electrode assembly 100 during the operation (in particular, peeling of the active material layer at the bonded portion between the tape and the active material layer) and the problem of reduction of the restraining force caused by the deflection of the tape during the operation.

Further, since thermal shrinking is implemented with respect to the heat shrinkable film 50 on the end faces 14 of the laminated electrode assembly 100, the heat shrinkable film 50 after the shrinking can be maintained in the prismatic shape of the laminated electrode assembly 100. As a result, the shape of the laminated electrode assembly 100 can be stabilized.

In addition, unlike the tape fixing that generates the tension locally, the tension can be generated relatively uniformly, so that the load applied to the laminate 10 (in particular, the positive electrode active material layer 24 of the positive electrode sheet 20 and the negative electrode active material layer 34 of the negative electrode sheet 30) can be reduced.

Furthermore, it is not necessary to perform a complex operation of affixing the tape at a plurality of places.

Therefore, through the steps S101 to S103, it is possible to obtain the stably restrained laminated electrode assembly 100 with satisfactory operation efficiency.

Next, variation examples of the present embodiment will be described.

Variation Example 1

Figure 6A:
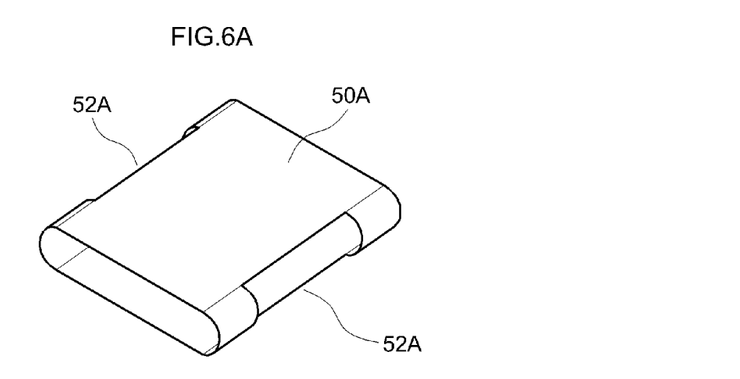
FIGS. 6A to 6C are perspective views schematically showing an outline of a variation example of the embodiment of the present teaching.
Figure 6B:
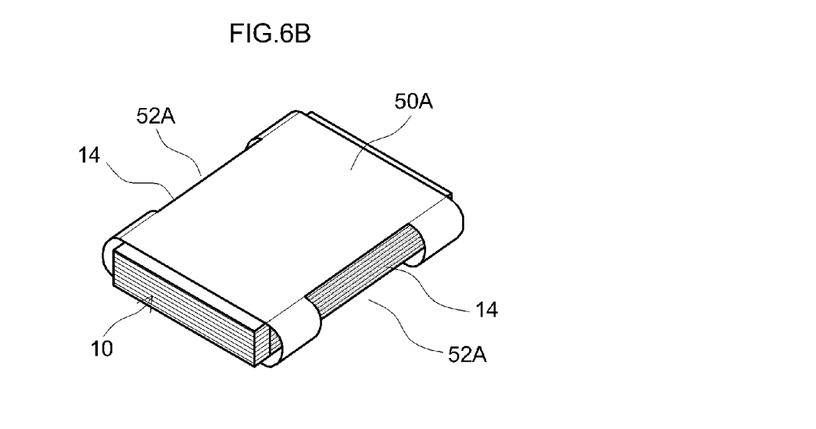

In Variation Example 1, as shown in FIG. 6A, a heat shrinkable film 50A has cutout portions 52A. As shown in FIG. 6B, in the enveloping step S102, the cutout portions 52A are arranged on the end faces 14 parallel to the lamination direction of the laminate 10.

Specifically, a cutout portion is provided in the center of a portion of the heat shrinkable film 50A to be disposed on each of the pair of end faces 14 of the laminate.

After carrying out the above-described laminate preparation step S101, in the enveloping step S102, the cutout portions 52A of the heat shrinkable film 50A are disposed on the end faces 14 parallel to the lamination direction of the laminate 10. The laminated electrode assembly 100A can then be produced by carrying out the heating step S103.

Figure 6C:
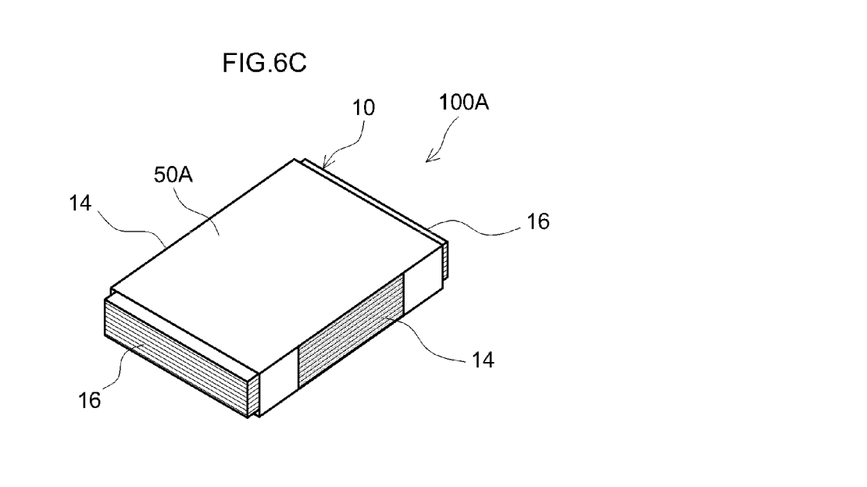

As shown in FIG. 6C, in the laminated electrode assembly 100A which has thus been produced, a pair of end faces 16 of the laminate 10 which is not enveloped by the heat shrinkable film 50A is open. Further, parts of the end faces 14 parallel to the lamination direction of the laminate 10 are also opened by the cutout portions of the heat shrinkable film 50A. Therefore, it is possible to increase the area of the opening portions at the end faces 14 parallel to the lamination direction of the laminated electrode assembly 100A by the cutout portions 52A of the heat shrinkable film 50A. This improves the impregnation property of the nonaqueous electrolyte into the laminated electrode assembly 100A when producing a nonaqueous electrolyte secondary battery such as a lithium ion secondary battery. In addition, the absorption property and release property of the nonaqueous electrolyte during charging and discharging of the nonaqueous electrolyte secondary battery are improved. Furthermore, the release property of gas from the laminated electrode assembly 100A when an abnormality occurs in the nonaqueous electrolyte secondary battery is improved.

In FIG. 6, the heat shrinkable film 50A has two cutout portions, but the number of cutout portions of the heat shrinkable film 50A is not particularly limited.

As an example, the case of using a heat shrinkable film provided with one cutout portion will be described hereinbelow. In this configuration, the cutout portion is not provided at the end face of the laminated electrode assembly directly below the injection liquid in order to prevent the electrode assembly from being damaged by the pressure at the time of injection of the nonaqueous electrolyte when producing a nonaqueous electrolyte secondary battery using a laminated electrode assembly. Then, the cutout portion of the heat-shrinkable film is disposed on the end face facing the bottom face of the nonaqueous electrolyte secondary battery, thereby obtaining the above-mentioned merits provided by the cutout portion.

Variation Example 2

Figure 7A:
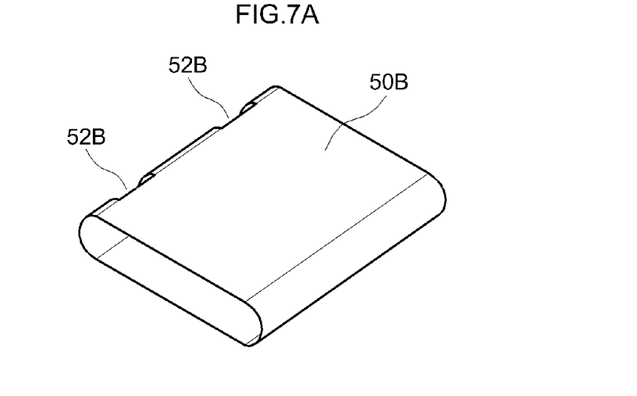
FIGS. 7A to 7C are perspective views schematically showing an outline of another variation example of the embodiment of the present teaching.
Figure 7B:
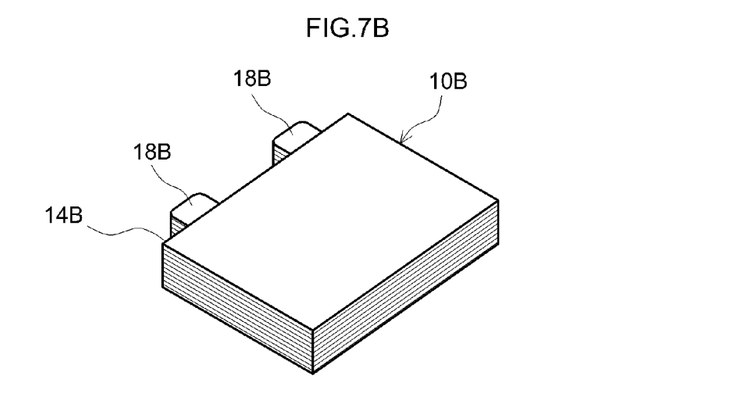

In Variation Example 2, as shown in FIG. 7A, a heat shrinkable film 50B has two cutout portions 52B. Further, as shown in FIG. 7B, a laminate 10B has current collecting tabs 18B of electrodes (positive electrode and negative electrode) on an end face 14B parallel to the lamination direction.

Figure 7C:
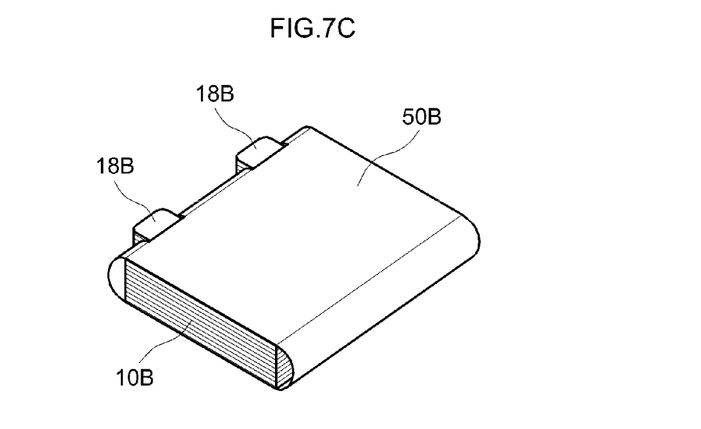

After carrying out the above-described laminate preparation step S101, as shown in FIG. 7C, in the enveloping step S102, the cutout portions 52B are disposed on the end face 14B parallel to the lamination direction of the laminate 10B so that the current collecting tabs 18B of the laminate 10B protrude from the heat shrinkable film 50B. Then, a laminated electrode assembly can be prepared by carrying out the above-described heating step S103.

Thus, the number, size, and positions of the cutout portions are not particularly limited, as long as the laminated electrode assembly can be stably restrained, and can be appropriately set according to the design of the laminate.

Therefore, by providing a cutout portion in the heat shrinkable film, the film can be adapted to various designs of laminated electrode assemblies.

Variation Example 3

Figure 8:
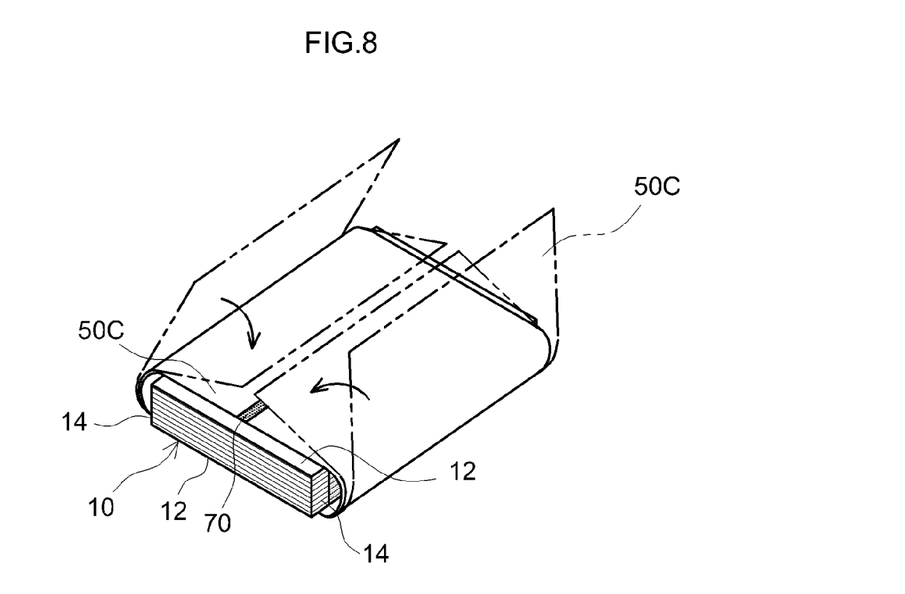
FIG. 8 is a perspective view schematically showing an outline of yet another variation example of the embodiment of the present teaching.

In Variation Example 3, as shown in FIG. 8, a sheet-like heat shrinkable film 50C is used.

After carrying out the above-described laminate preparation step S101, as shown in FIG. 8, in the enveloping step S102, the heat shrinkable film 50C is wound around the laminate 10, and the pair of main faces 12 and the pair of end faces 14 of the laminate 10 are enveloped by the heat shrinkable sheet (film) 50C. The winding can be easily performed, for example, by folding the heat shrinkable sheet (film) 50C so as to enclose the laminate 10C, and fixing one end portion and the other end portion of the heat shrinkable film 50C on the one main face 12 of the laminate 10 with a pressure-sensitive adhesive tape 70. Then, a laminated electrode assembly can be prepared by carrying out the above-described heating step S103.

In Variation Example 3, the operation of enveloping the four faces of the laminate 10C with the heat shrinkable film 50C is greatly facilitated by using the sheet-like heat shrinkable film 50C and the pressure-sensitive adhesive tape 70.

A secondary battery (particularly, a nonaqueous electrolyte secondary battery such as a lithium ion secondary battery) can be prepared using the laminated electrode assembly produced as described above. For example, a nonaqueous electrolyte secondary battery such as a lithium ion secondary battery can be prepared by attaching a positive electrode terminal and a negative electrode terminal to the laminated electrode assembly according to a conventional method and housing the laminated electrode assembly together with a nonaqueous electrolyte in a battery case.

A secondary battery (particularly, a nonaqueous electrolyte secondary battery such as a lithium ion secondary battery) using the laminated electrode assembly produced as described above can be used for various applications. Suitable applications include drive power supplies mounted on vehicles such as plug-in hybrid vehicles (PHV), hybrid vehicles (HV) and electric vehicles (EV).

In the present specification, the term "secondary battery" refers generally to an electric storage device that can be repeatedly charged and discharged, and is a term encompassing storage elements such as the so-called storage batteries and electric double layer capacitors.

Although specific examples of the present teaching have been described in detail hereinabove, these examples are merely illustrative and do not limit the scope of the claims. The features set forth in the claims include those obtained by variously modifying and changing the specific examples.

What is claimed is:

1. A method for producing a laminated electrode assembly, comprising the steps of:
    preparing a laminate in which a plurality of positive electrode sheets and a plurality of negative electrode sheets are alternately laminated, and a separator is interposed between each positive electrode sheet and each negative electrode sheet;
    enveloping, with a tubular heat shrinkable film, four faces of the laminate including a pair of main faces perpendicular to a lamination direction of the laminate and facing each other, and a pair of end faces parallel to the lamination direction of the laminate, perpendicular to the main faces, and facing each other by inserting the laminate into the tubular heat shrinkable film; and
    cooling the pair of main faces in the direction parallel to the lamination direction of the laminate by sandwiching the pair of main faces between a pair of cooling plates to such a degree that the heat shrinkable film on the pair of main faces of the laminate is not shrunk, the sandwiching comprising applying by the cooling plates a predetermined load in the lamination direction of the laminate to compress the laminate to a predetermined thickness; and
    after the cooling, heating the pair of end faces in a direction perpendicular to the end faces, which is the direction perpendicular to the lamination direction of the laminate to thermally shrink the heat shrinkable film on the pair of end faces
    while the predetermined load applied by the cooling plates in the lamination direction of the laminate is maintained.

2. The method for producing a laminated electrode assembly according to claim 1, wherein the heat shrinkable film has a cutout portion, and the cutout portion is arranged on the end face parallel to the lamination direction of the laminate in the step of enveloping with the heat shrinkable film.

3. The method for producing a laminated electrode assembly according to claim 1, wherein the heating is performed entirely on the pair of the end faces of the laminate that are flat.

4. A method for producing a laminated electrode assembly, comprising the steps of:
    preparing a laminate in which a plurality of positive electrode sheets and a plurality of negative electrode sheets are alternately laminated, and a separator is interposed between each positive electrode sheet and each negative electrode sheet;
    enveloping, with a heat shrinkable film, four faces of the laminate including a pair of main faces perpendicular to a lamination direction of the laminate and facing each other, and a pair of end faces parallel to the lamination direction of the laminate and facing each other, the pair of end faces being perpendicular to the pair of main faces;
    cooling the pair of main faces in the direction parallel to the lamination direction of the laminate by sandwiching the pair of main faces between a pair of cooling plates to such a degree that the heat shrinkable film on the pair of main faces of the laminate is not shrunk, the sandwiching comprising applying by the cooling plates a predetermined load in the lamination direction of the laminate to compress the laminate to a predetermined thickness; and
    after the cooling, heating the pair of end faces in a direction perpendicular to the end faces, which is the direction perpendicular to the lamination direction of the laminate to thermally shrink the heat shrinkable film on the pair of end faces
    while the predetermined load applied by the cooling plates in the lamination direction of the laminate is maintained.

* * * * *